United States Patent
McNelley et al.

(10) Patent No.: US 9,639,838 B2
(45) Date of Patent: *May 2, 2017

(54) MANAGEMENT OF BIOMETRIC INFORMATION

(71) Applicant: Early Warning Services, LLC, Scottsdale, AZ (US)

(72) Inventors: Julie McNelley, Oakland, CA (US); Glen Sgambati, Glendale, AZ (US); Sathish Anickode, Scottsdale, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 97 days.

This patent is subject to a terminal disclaimer.

(21) Appl. No.: 14/571,090

(22) Filed: Dec. 15, 2014

(65) Prior Publication Data
US 2015/0170143 A1    Jun. 18, 2015

Related U.S. Application Data

(63) Continuation of application No. 14/141,129, filed on Dec. 26, 2013, now Pat. No. 8,938,398, which is a
(Continued)

(51) Int. Cl.
*G06Q 40/00* (2012.01)
*G06Q 20/40* (2012.01)
(Continued)

(52) U.S. Cl.
CPC ......... *G06Q 20/40* (2013.01); *G06K 9/00885* (2013.01); *G06Q 20/401* (2013.01);
(Continued)

(58) Field of Classification Search
CPC ............. G06Q 20/385; G06Q 20/40; G06Q 20/40145; G06Q 30/0201; G06Q 40/00; G06Q 40/02
(Continued)

(56) References Cited

U.S. PATENT DOCUMENTS 5,386,104 A    1/1995  Sime
5,930,804 A *  7/1999  Yu ........................... G06F 21/32
(Continued)

OTHER PUBLICATIONS

Mayo, R., Sgambati, G., & Perrotta, R. (1201). Identity verification switch Retrieved from http://search.proquest.com/docview/926386360?accountid=14753 retrieved Jan. 13, 2016.*
(Continued)

*Primary Examiner* — Kito R Robinson
(74) *Attorney, Agent, or Firm* — Kilpatrick Townsend & Stockton LLP (57) ABSTRACT

Fraud risk is monitored in financial transactions. Biometric information is received over the communications interface configured to exchange data with multiple distinct financial institutions. The received biometric information is compared with a database of biometric information to identify an individual. A fraud-detection analysis is performed on the financial transaction information associated with the individual. The financial transaction information associated with the individual is identified as suspicious in accordance with a result of the fraud-detection analysis. The biometric parameters associated with the individual are designated as associated with suspicious financial activity.

18 Claims, 7 Drawing Sheets

Related U.S. Application Data continuation of application No. 11/396,247, filed on Mar. 30, 2006, now abandoned.

(51) Int. Cl.
*G06Q 40/02* (2012.01)
*H04L 29/06* (2006.01)
*G06K 9/00* (2006.01)

(52) U.S. Cl.
CPC ....... *G06Q 20/403* (2013.01); *G06Q 20/4016* (2013.01); *G06Q 20/40145* (2013.01); *G06Q 40/02* (2013.01); *H04L 63/0861* (2013.01)

(58) Field of Classification Search
USPC ............................................ 705/44; 235/379
See application file for complete search history.

(56) References Cited

U.S. PATENT DOCUMENTS

| | | | | |
|---|---|---|---|---|
| 6,018,739 | A * | 1/2000 | McCoy | G06K 9/00006 |
| 6,072,894 | A * | 6/2000 | Payne | G07C 9/00158 |
| | | | | 235/375 |
| 6,230,148 | B1 * | 5/2001 | Pare, Jr. | G01F 19/005 |
| | | | | 380/229 |
| 6,594,376 | B2 | 7/2003 | Hoffman et al. | |
| 6,957,339 | B2 * | 10/2005 | Shinzaki | G06F 21/32 |
| | | | | 713/182 |
| 7,177,846 | B2 | 2/2007 | Moenickheim et al. | |
| 7,246,740 | B2 * | 7/2007 | Swift | G06Q 20/04 |
| | | | | 235/379 |
| 7,566,002 | B2 * | 7/2009 | Love | G06Q 10/063 |
| | | | | 235/379 |
| 8,109,435 | B2 * | 2/2012 | Mayo | G06Q 20/027 |
| | | | | 235/379 |
| 8,296,573 | B2 * | 10/2012 | Bolle | G06F 21/32 |
| | | | | 713/186 |
| 8,345,931 | B2 * | 1/2013 | Jeronimus | G06Q 20/10 |
| | | | | 340/5.83 |
| 2001/0000535 | A1 * | 4/2001 | Lapsley | G01F 19/005 |
| | | | | 705/64 |
| 2001/0039533 | A1 * | 11/2001 | Pare, Jr. | G01F 19/005 |
| | | | | 705/39 |
| 2002/0025062 | A1 * | 2/2002 | Black | G06F 3/03545 |
| | | | | 382/116 |
| 2002/0153414 | A1 | 10/2002 | Stoutenburg et al. | |
| 2003/0061172 | A1 * | 3/2003 | Robinson | G06Q 20/04 |
| | | | | 705/67 |
| 2003/0069856 | A1 | 4/2003 | Seifert et al. | |
| 2003/0126121 | A1 | 7/2003 | Khan et al. | |
| 2003/0154406 | A1 * | 8/2003 | Honarvar | G06Q 10/10 |
| | | | | 726/10 |
| 2003/0163417 | A1 | 8/2003 | Cachey et al. | |
| 2004/0024694 | A1 | 2/2004 | Lawrence et al. | |
| 2004/0199469 | A1 * | 10/2004 | Barillova | G06Q 20/04 |
| | | | | 705/44 |
| 2004/0245330 | A1 * | 12/2004 | Swift | G06Q 20/04 |
| | | | | 235/379 |
| 2004/0250085 | A1 * | 12/2004 | Tattan | G06F 21/32 |
| | | | | 713/186 |
| 2004/0258281 | A1 * | 12/2004 | Delgrosso | G06K 9/00973 |
| | | | | 382/115 |
| 2005/0187843 | A1 * | 8/2005 | Lapsley | G01F 19/005 |
| | | | | 705/35 |
| 2006/0085357 | A1 * | 4/2006 | Pizarro | G06Q 20/10 |
| | | | | 705/64 |
| 2006/0106605 | A1 | 5/2006 | Saunders et al. | |
| 2006/0144927 | A1 * | 7/2006 | Love | G06Q 10/063 |
| | | | | 235/380 |
| 2006/0253710 | A1 | 11/2006 | Koo | |
| 2007/0012757 | A1 * | 1/2007 | Mayo | G06Q 20/027 |
| | | | | 235/379 |
| 2007/0208662 | A1 * | 9/2007 | Jeronimus | G06Q 20/10 |
| | | | | 705/44 |
| 2007/0214093 | A1 * | 9/2007 | Colella | G06Q 20/04 |
| | | | | 705/67 |
| 2007/0288998 | A1 * | 12/2007 | Gudigara | G06F 21/32 |
| | | | | 726/5 |
| 2008/0282334 | A1 * | 11/2008 | Yves | G06Q 20/341 |
| | | | | 726/9 |
| 2009/0083841 | A1 * | 3/2009 | Gierach | H04L 9/3231 |
| | | | | 726/7 |
| 2009/0173781 | A1 * | 7/2009 | Ramachandran | G06Q 20/042 |
| | | | | 235/379 |
| 2011/0000961 | A1 * | 1/2011 | McNeal | G06Q 20/042 |
| | | | | 235/382 |
| 2012/0032782 | A1 * | 2/2012 | Colella | G06Q 20/385 |
| | | | | 340/5.83 |

OTHER PUBLICATIONS

Leuchter, M., & Luke, R. (2000). Biometrics at the crossroads. Bank Technology News, 13(9), 1. Retrieved from https://dialog.proquest.com/professional/professional/docview/672266735?accountid=142257 on Feb. 28, 2017.*
Oehlsen, N. (2005). Putting a finger on biometrics: Biometrics vendors generally are mum on specifics regarding tests of their systems at the point of sale. and many retailers and consumers remain cautious in their views about the technology. Credit Card Management, 18(2), 46(4). on Feb. 28, 2017.*
Comment: Biometrics offers security—but legal worries too. (1996). American Banker 11. Retrieved from https://dialog.proquest.com/professional/professional/docview/680786240?accountid=142257 on Feb. 28, 2017.*
Britt, P. "High-tech indentification systems come of age," America's Community Banker (1998), 7(6), pp. 22-27, Retrieved Sep. 2, 2014, 6 pages.
U.S. Appl. No. 10/047,917, filed Jan. 2002, Kroon.
U.S. Appl. No. 10/773,642, filed Feb. 2004, Sgambati, et al.
Concord EFS, Inc. brochure entitled "Risk Management Services", published on or before 2005, 8 pages.
Concord EFS, Inc. brochure entitled "Risk Management Services: IDLogix C100 Handheld Terminai—Detecting Invalid and Counterfeit Identification", published on or before 2005, 4 pages.
Primary Payment Systems, Inc. brochure entitled "Deposit Chek-Preventing Losses on . . . Checks and Other Payments at Financial Institutions", 2002, 2 pages.
Primary Payment Systems, Inc. brochure entitled "Risk Management Services: Decision Chek On-SiteDetecting Fraudulent Checks at the Point-of-Sale", 2003, 4 pages.
Primary Payment Systems, Inc. brochure entitled "Risk Management Services: Decision Chek-Preventing Check Losses at the Point-of-Presentment", 2003, 4 pages.
Primary Payment Systems, Inc. brochure entitled "Risk Management Services: Identity Chek-Detecting Fraud when Establishing New Relationships", 2003, 6 pages.
Primary Payment Systems, Inc. brochure entitled "Risk Management Services: Identity Chek-Web and Developer Service", 2003, 4 pages.

* cited by examiner

MANAGEMENT OF BIOMETRIC INFORMATION

CROSS REFERENCES TO RELATED APPLICATIONS

This application is a continuation of U.S. application Ser. No. 14/141,129 filed on Dec. 26, 2013, which is a continuation of U.S. application Ser. No. 11/396,247 filed on Mar. 30, 2006, both of which are hereby expressly incorporated by reference in their entirety for all purposes as if fully set forth herein.

BACKGROUND OF THE INVENTION

This application relates generally to biometrics. More specifically, this application relates to management of biometric information used in fraud-detection analyses for financial applications.

In recent years, there has been a steadily increasing emphasis on the potential for using biometrics to identify individuals reliably. Generally, "biometrics" refers to the use of statistical analysis to characterize living bodies, with such characteristics commonly being used to identify human individuals. Different physical features may be used for the characterization, with a widely known and conventional form of biometric being fingerprints. Other physical features that may be used for biometric functions include geometrical facial structures, structures of the iris or retina in eyes, geometrical structure of a person's hand, vein structure, voiceprints, and the like.

At the same time as biometrics have been developing in sophistication as potentially useful mechanisms for identifying individuals, there has also been a separate increase in various types of fraud, one example of which is the phenomenon of "identity theft," in which a victim's identity is misappropriated and used fraudulently to gain access to the victim's financial affairs. The cost of fraud is large, not only in terms of the cumulative financial impact of the large number of instances that now routinely occur, but also in terms of its impact on victims.

The use of biometrics has been recognized as a potential way to limit the ability to engage in identity theft. This is because the biometric is ultimately tied to the physical characteristics of individuals, not to extraneous forms of identification. It is considerably more difficult to reproduce forgeries of biological characteristics than it is of paper documents, and certainly much more difficult to engage in their actual theft. Despite this recognition, there has been relatively little effort expended on integrating the use of biometric identifications into an infrastructure used in coordination financial transactions. There is accordingly a general need in the art for such integration.

BRIEF SUMMARY OF THE INVENTION

In a first set of embodiments, a system is provided for monitoring fraud risk in financial transactions. A communications interface is configured to exchange data between the system and a plurality of distinct financial institutions. A storage device maintains a database of biometric information associating biometric parameters with identified individuals and maintains a database of financial transaction information associated with the individuals. A processor is provided in communication with the communications interface and with the storage device. A memory is coupled with the processor. The memory comprises a computer-readable storage medium having a computer-readable program therein for operating the system to monitor fraud risk in financial transactions. The computer-readable program has instructions to receive biometric information over the communications interface. It also has instructions to compare the received biometric information with the database of biometric information to identify an individual. A fraud-detection analysis is performed on the financial transaction information associated with the individual. The financial transaction information associated with the individual is identified as suspicious in accordance with a result of the fraud-detection analysis. The biometric parameters associated with the individual are designated as associated with suspicious financial activity.

The individual may comprise an employee of one of the plurality of distinct financial institutions. In some embodiments, the computer-readable program also has instructions for transmitting a warning over the communications system that the biometric parameters associated with the individual have been designated as associated with suspicious financial activity.

The biometric information may comprise raw biometric data or may comprise derived biometric parameters in different embodiments. In one embodiment, the instructions for receiving biometric information over the communications interface further comprise instructions for receiving at least part of a commercial transaction request over the communications interface. A denial of the commercial transaction request may then be transmitted over the communications interface. The distinct financial institutions may comprise a bank or may comprise a money-transfer organization in different embodiments. For example, in one embodiment, the instructions for receiving biometric information over the communications interface comprise instructions for receiving biometric information from one of the plurality of distinct financial institutions.

The communications interface may be further configured to exchange data between the system and a plurality of distinct merchants. In such embodiments, the instructions for receiving biometric information over the communications interface may comprise instructions for receiving biometric information from one of the plurality of distinct merchants.

In certain embodiments, second biometric information is also received over the communications interface. The received second biometric information is compared with the database of biometric information to identify a second individual. Details of the financial transaction information associated with the second individual are then returned over the communications interface.

In a second set of embodiments, a similar structure is used for managing biometric information. The computer-readable program comprises instructions for receiving biometric information over the communications interface. The received biometric information is compared with the database of biometric information to identify an individual. An analysis is performed on the financial transaction information associated with the individual. The financial transaction information is identified as favorable in accordance with a result of the analysis. The biometric parameters associated with the individual are designated as associated with favorable financial activity.

In some such embodiments, the individual may comprise an employee of one of the plurality of distinct financial institutions. The received biometric information may comprise raw biometric data or may comprise derived biometric parameters in different embodiments. In one embodiment, second biometric information is received over the communications interface. The received second biometric information is compared with the database of biometric information to identify a second individual. Details of the financial transaction information associated with the second individual are returned over the communications interface.

In a third set of embodiments, a system is provided for managing the use of biometric information. A communications interface is configured to exchange data between the system and a plurality of distinct financial institutions. Each of the distinct financial institutions maintains a data store of biometric information associating biometric parameters with identified individuals and maintains a database of financial transaction information associated with the individuals. A storage device maintains records identifying, for each of a plurality of individual, which of the plurality of distinct financial institutions maintains the data store of biometric information associating biometric parameters with the each of the plurality of individuals. A processor is provided in communication with the communications interface and with the storage device. A memory is coupled with the processor and comprises a computer-readable storage medium having a computer-readable program embodied therein for operating the system to manage the use of biometric information. The computer-readable program comprises instructions for receiving biometric information and a purported identity of a specified individual over the communications interface from a requesting party. The records maintained on the storage device are used to identify which of the plurality of distinct financial institutions maintains the data store of biometric information associating biometric parameters with the specified individual. The received biometric information is routed to the identified financial institution. Results of a comparison of the received biometric information and the biometric parameters associated with the specified individual are received. The results are transmitted over the communications interface to the requesting party.

In these embodiments also, the specified individual may comprise an employee of one of the plurality of distinct financial institutions, and the received biometric information may comprise raw biometric data or derived biometric parameters in different embodiments.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide an integrated infrastructure that permits different, unrelated entities to make use of structures for managing biometric information in considering and executing a variety of different kinds of financial transactions. For example, in some embodiments, a common biometrics repository is provided; in other embodiments, the biometric information is stored in discrete data stores distributed over a network, with a biometric switch coordinating the routing of information over the network. These architectures permit the use of biometrics in a wide array of applications. In some instances, the biometrics are used to verify purported identities of individuals and in other instances, the biometrics are used for independent identification of individuals. These kinds of identification may be negative or positive—that is, organizations may associate negative characteristics of individuals with biometric information such as when they have criminal records, or may associate positive characteristics such as when they have a history of desirable behavior with the organizations.

Figure 1A:
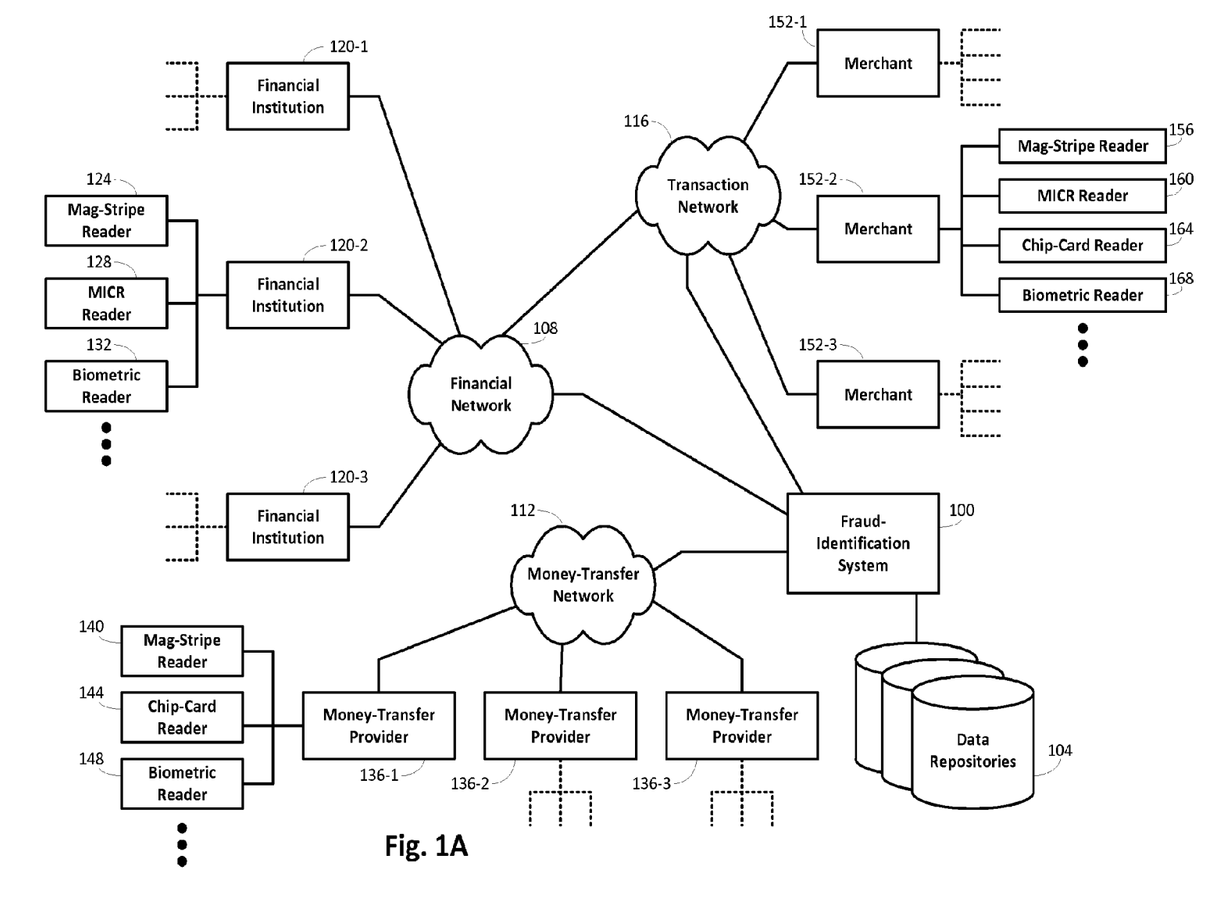
FIG. 1A illustrates a schematic overview of a first architecture in which embodiments of the invention may be implemented.

An overview of a structure that may be used for embodiments that make use of a biometrics repository is provided with the schematic diagram of FIG. 1A. The structure of the architecture illustrated in this drawing may be considered to surround a fraud-identification system 100 that has access to a number of data repositories 104 used in monitoring transactions for irregularities that may signal potential fraud. The combination of the capabilities of the fraud-identification system 100 and the data repositories 104 permits it to act as a trusted registrar with which biometric data are checked. The data repositories 104 may include a biometrics repository that comprises a database associating biometric parameters with identities of individuals. In some instances, the individuals may comprise employees or customers of financial institutions or merchants integrated within the architecture. When the individuals comprise employees, the actions taken by the fraud-identification system 100 may be forms of employee-information screening. The biometric parameters may comprise raw biometric parameters, such as in embodiments where an entire fingerprint is stored or where a retinal pattern is stored. Alternatively, the biometric parameters may comprise derived biometric parameters, such as in embodiments where geometrical positions of fingerprint minutiae or other statistical characteristics of a raw biometric pattern are stored. More generally, the information stored in the biometrics repository may comprise any type of biometric information, including information that results from fingerprints or other dermatoglyphic patterns, hand or facial geometry, retinal or iris patterns, vein structure, and the like. In some embodiments, the biometrics repository stores multiple types of biometric information.

The other data repositories 104 may include a variety of types of financial transaction information, which may also be associated with particular individuals (including employees or customers). The financial transaction information stored in the data repositories 104 may be obtained from a variety of different sources and subjected to statistical analyses using methods known in the art to identify irregularities characteristic of potential fraud. It is thus generally anticipated that improved fraud detection results when the financial transaction information stored in the data repositories 104 is relatively complete. While embodiments of the invention may readily use information that contains gaps, the presence of such gaps has the potential of obscuring certain behaviors that might otherwise be used in identifying potential fraud.

Collection of the financial transaction information is facilitated with interfaces between the fraud-identification system and a variety of financial networks, some of which are identified in FIG. 1A for illustrative purposes. For example, the fraud-identification system 100 may be interfaced with a financial network 108 through which communications with or among financial institutions 120 are routed. The financial institutions 120 may comprise a variety of different types of financial institutions, and embodiments of the invention are not limited by the specific types of financial services offered by the respective financial institutions 120. For example, the financial institutions 120 may comprise banks, credit unions, trust organizations, brokerage firms, and/or the like. Interactions by individuals (including employees or customers) with respective financial institutions may be effected with a number of different types of devices, some of which are indicated explicitly in the drawing. For example, magnetic-stripe readers 124 may be used to read a variety of different card instruments, including bank cards, credit cards, debit cards and the like, as well as identity instruments such as drivers' licenses that include magnetic-stripe cards. Magnetic-ink readers 128 may be used to read a variety of instruments that have information printed on them using magnetic ink, such as checks, deposit slips, and the like.

In addition to these type of devices, biometric readers 132 may be provided to collect biometric information from individuals (including employees or customers). The specific design of the biometric readers 132 may vary, depending on the type of biometric to be collected. For example, fingerprints may be collected using optical fingerprint readers that use total internal reflection to discriminate between ridges and valleys in the surface structure of fingers. Facial geometry measurements may be collected using digital cameras coupled with computational units that perform eigenvalue analyses to extract characterizing features. Similar techniques may be performed using cameras to collect biometric retinal or iris information. Hand geometry measurements may be collected using a template over which a user places his hand, resulting in separation of the fingers, to permit cameras to acquire top and side views of the hand.

The fraud-identification system 100 may also be interfaced with a transaction network 116 through which transaction information may be routed both to the financial network 108 and to the fraud-identification system 100. The routing through the financial network 108 permits transaction information to be considered by financial institutions as described in further detail below to determine whether to approve or deny particular transactions by customers with merchants. The routing to the fraud-identification system 100 generally includes biometric information collected when the transaction is staged, permitting authentication of the biometric information by a centralized source. In some embodiments, particulars of the transaction are also routed to the fraud-identification system, which may then add such particulars and/or information derived from such particulars to the data repositories. This information then becomes part of the body of data that may be used by the fraud-identification system in identifying patterns that indicate the existence of suspicious behavior.

The transaction network 116 receives transaction information from merchants 152, each of which may in turn collect transaction information at a point-of-sale using a variety of different types of devices. Some of these devices are identified explicitly in FIG. 1, such as a magnetic-stripe reader 156, a magnetic-ink reader, a chip-card reader 164, and the like. The availability of multiple types of devices provides versatility in accepting different forms of payment from a customer, and may sometimes simplify providing a self-service facility for executing transactions with a customer. Examples of point-of-sale devices that include multiple capabilities for identifying transaction instruments are provided in the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al.; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg ("the point-of-sale device applications"). Biometric information at a point-of-sale may be collected using a biometric reader 168, which may have any of the structures described above in different embodiments, depending on the specific type of biometric information to be collected.

The fraud-identification system 100 may also be interfaced with a money-transfer network 112, over which currency-transfer transactions may be executed between money-transfer providers 136. Again, each of the money-transfer providers 136 may have a number of different types of devices for collecting or providing funds in executing the money-transfer transactions, such as magnetic-stripe readers 140, chip-card readers 144, and the like. In some embodiments, such devices may be comprised by an integrated point-of-sale device as described in the point-of-sale device applications. Biometric information may be collected using a biometric reader 148 like those described above.

Figure 1B:
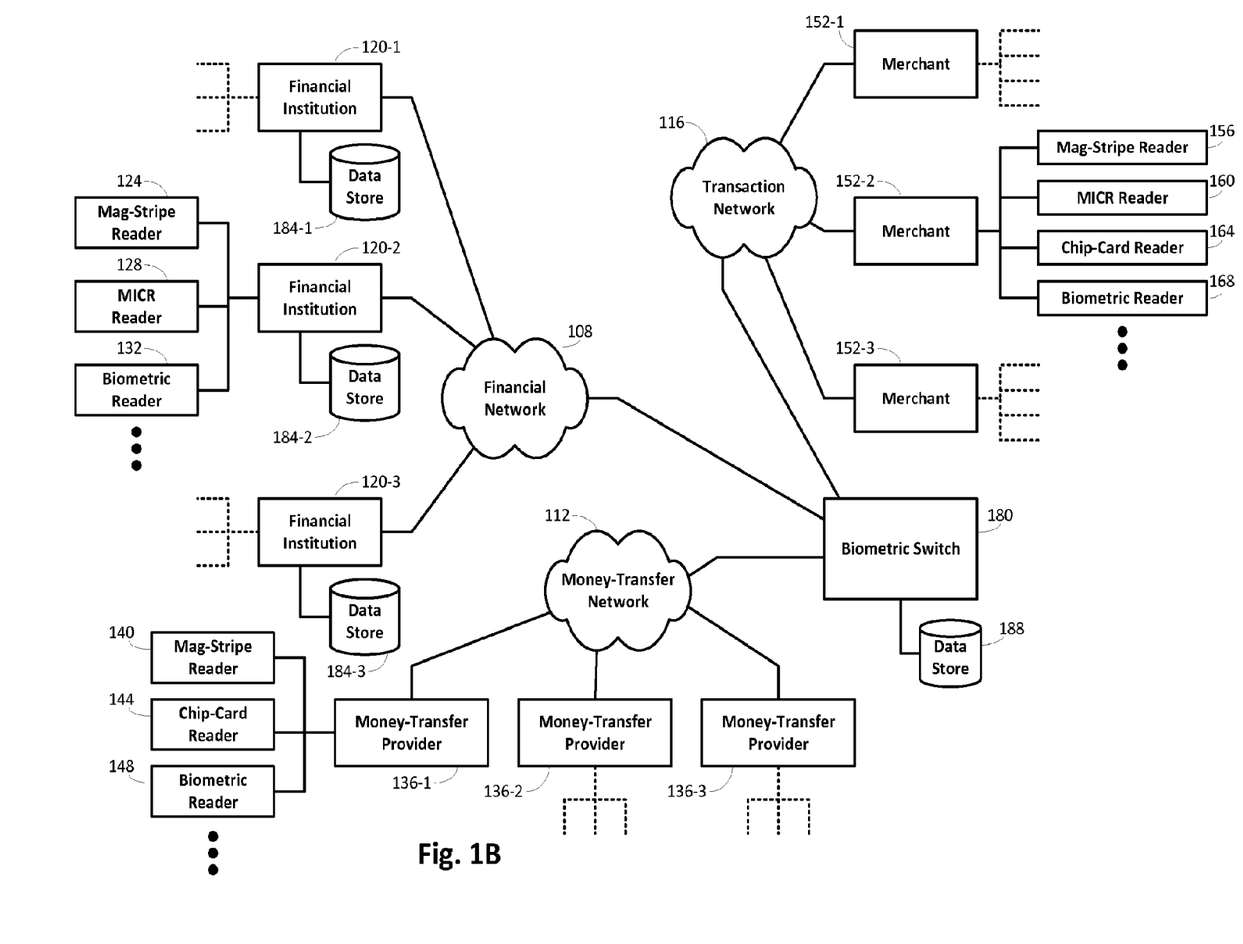
FIG. 1B illustrates a schematic overview of a second architecture in which embodiments of the invention may be implemented.

An overview of a structure that makes use of a distributed network throughout which biometric information may be stored is illustrated in FIG. 1B. The basic architecture shown in this drawing is generally similar to the architecture described in connection with FIG. 1A. The architectures differ in that the fraud-identification system 100 has been replaced by a biometric switch 180 and the biometrics repository has been replaced by data stored at data stores 184 associated with respective financial institutions 120. The operation of the architecture is accordingly similar to that described in connection with FIG. 1A, but differs in that the biometric switch 180 acts to coordinate the routing of requests for biometric analyses and the results of those requests so that the locally stored biometric information may be applied directly. The biometric switch 180 may accordingly comprises its own data store 188 that maintains information used in implementing the routing of requests and responses over the network defined by the architecture.

Figure 2:
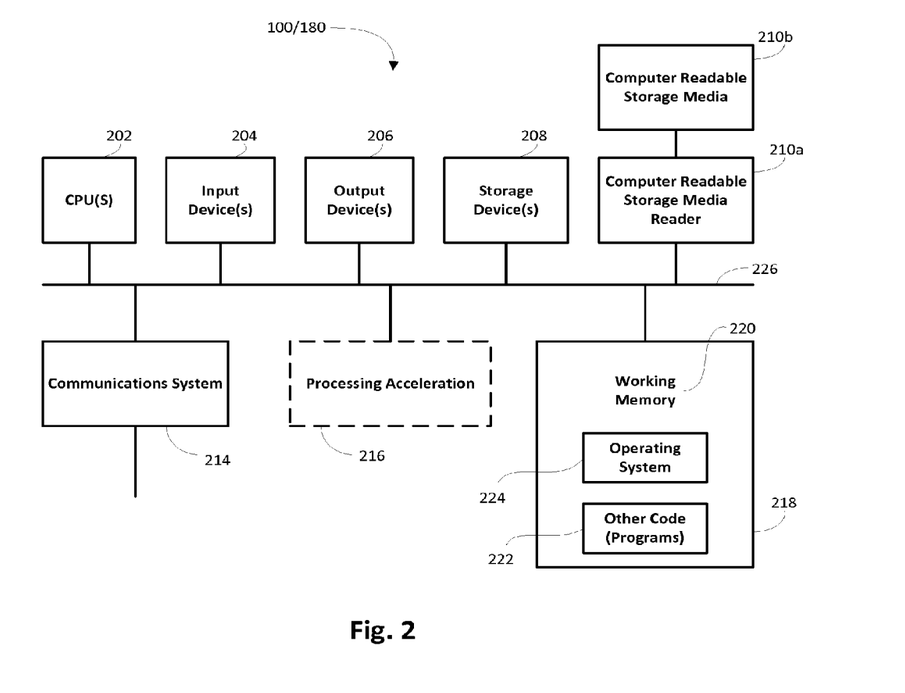
FIG. 2 illustrates a schematic structure of a computational device on which methods of the invention may be embodied.

The fraud-identification system 100 or the biometric switch 180 may advantageously be embodied on a computational device such as illustrated schematically in FIG. 2, which broadly illustrates how individual system elements may be implemented in a separated or more integrated manner. The system 100 or switch 180 is shown comprised of hardware elements that are electrically coupled via bus 226. The hardware elements include a processor 202, an input device 204, an output device 206, a storage device 208, a computer-readable storage media reader 210a, a communications system 214, a processing acceleration unit 216 such as a DSP or special-purpose processor, and a memory 218. The computer-readable storage media reader 210a is further connected to a computer-readable storage medium 210b, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged with the transaction network 116, the financial network 108, and/or the money-transfer network 112.

The computational device 200 also comprises software elements, shown as being currently located within working memory 220, including an operating system 224 and other code 222, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 3A:
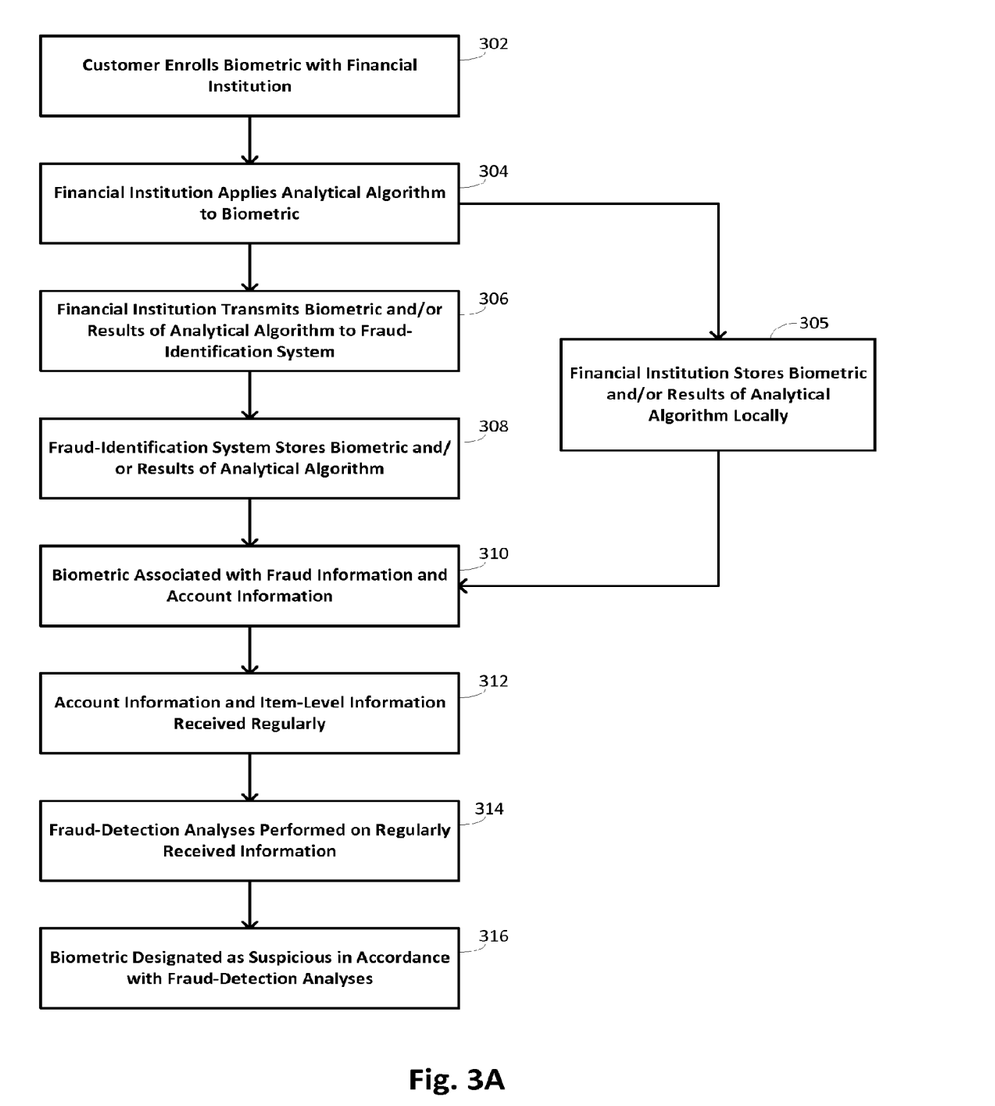
FIGS. 3A-3D are flow diagrams illustrating methods of the invention that may be implemented within the architectures shown in FIGS. 1A and 1B.

Methods of the invention are illustrated with the flow diagrams of FIGS. 3A-3D. FIG. 3A illustrates an overview of how information collected from various sources may be used to identify potentially fraudulent financial activity and associate such an identification with one or more biometrics. Such methods broadly begin with customer or employee enrollment of biometric information into the system. For instance, as indicated at block 302, a customer may enroll his biometric with a financial institution 120, which applies a standardized analytical algorithm to the collected biometric at block 304. Such a standardized algorithm seeks to identify sufficiently many distinguishing characteristics that a later match with the distinguishing characteristics is highly likely to be a unique identity confirmation. For instance, the analytical algorithm might operate on a fingerprint pattern to identify and record minutiae. Alternatively, the analytical algorithm might operate on a facial-geometry pattern to extract eigenvalue identifications. In embodiments using the architecture shown in FIG. 1A, the financial institution 120 then transmits the results of the analytical algorithm to the fraud-identification system 100 at block 306. If an architecture like that shown in FIG. 1B is used, the biometric or results of the analytical algorithm are instead stored locally at the financial institution 120 in the data store 184 at block 304.

In some alternative embodiments, the financial institution 120 may transmit a raw biometric to the fraud-identification system 100 at block 306, permitting application of the analytical algorithm to be made by the fraud-identification system 100 itself. The system 100 stores the biometric and/or the results of applying the analytical algorithm, whether the algorithm be applied by the fraud-identification system or by another party, in the biometric repository at block 308.

Irrespective of where the biometric information is stored, whether it be centrally as in an architecture like that shown in FIG. 1A or in a distributed fashion as in an architecture like that shown in FIG. 1B, an association may be made in some embodiments between the stored biometric and fraud information and account information at block 310. It is generally anticipated that account information and item-level transaction information will regularly be received over the financial network 108, the money-transfer network 112, and/or the transaction network 116, as indicated at block 312. This regularly received information is analyzed with fraud-detection algorithms at block 314. Such fraud-detection algorithms typically seek to identify patterns of behavior evident from the item-level transaction and account information that raise a suspicion of fraud. For example, some relatively simple fraud patterns that may be identified are multiple near-simultaneous transactions originating at different geographical locations by the same individual. More complex fraud patterns that might be identified take place over extended periods of time and are evident by repeated inconsistencies in transactions. The scope of potential fraud patterns that may be identified is large and known to those of skill in the art. When a particular analysis identifies a suspicious pattern that may be associated with a particular biometric, that biometric is designated as suspicious at block 316.

The methods of FIG. 3A may operate substantially continuously, collecting updated account information from financial institutions, collecting item-level transaction information as transactions are executed, and adding additional biometric information as new customers become enrolled. The fraud-identification system thus has comprehensive and evolving information that may be used in detecting fraud and in coupling such detection with biometric methods.

Figure 3B:
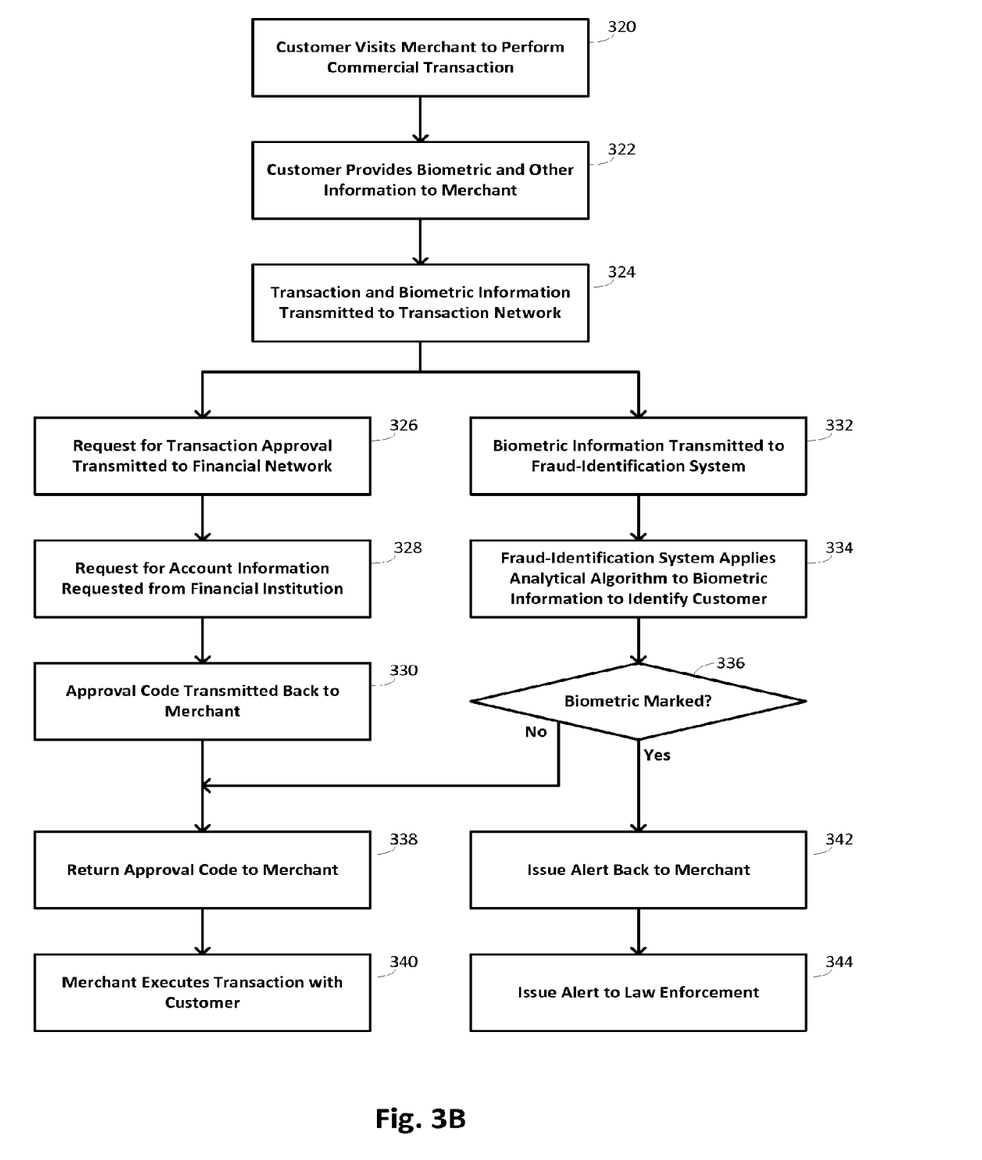

The availability of this information may thus find application in the context of individual transactions, as illustrated by the flow diagram of FIG. 3B. When a customer visits a merchant to engage in a commercial transaction at block 320, such as for the purchase of goods and/or services, the customer may provide a biometric identification and perhaps other information to the merchant 152 at block 322. For example, the biometric identification might operate solely as a mechanism to verify the identity of the customer, but might alternatively act as a mechanism to access financial accounts of the customer's used in support of the transaction. In embodiments where it is used solely as an identification mechanism, the other information provided to the merchant 152 may comprise information used in identifying the financial account(s) to be used in supporting the transaction.

Irrespective of how the biometric information is to be used, transaction and biometric information is transmitted from the merchant 152 to the transaction network 116 at block 324. The transaction information might comprise item-level information that specifies each product that is to be purchased as part of the transaction and its price, or might comprise higher-level information that specifies only the total transaction amount. Processing of the transaction may follow a two-pronged path in some embodiments. The left prong in FIG. 3B, beginning at block 326, shows how financial aspects of the transaction may be processed, while the right prong in FIG. 3B, beginning at block 332, shows how identification aspects of the transaction may be processed. Certain embodiments require satisfaction of both financial processing and identification processing to be satisfied for the transaction to be approved.

Thus, seeking approval for the financial aspects of the transaction begins at block 326 with a request for transaction approval being transmitted from the transaction network 116 to the financial network 108, which routes the request to the appropriate financial institution 120. The appropriate financial institution 120 may be identified by the financial network 108 using information included with the transaction-approval request. A request for sufficient account information to verify that adequate funds, or an equivalent credit line, are available to support the transaction is accordingly issued to the financial institution 120 at block 328. An approval code is transmitted back to the merchant 152 through the financial network 108 and transaction network 116 if the verification is successful.

Seeking approval for the identification aspects of the transaction begins at block 332 with the biometric information being transmitted to the fraud-identification system 100. The biometric information that is transmitted may comprise raw biometric data or may comprise biometric parameters derived from the raw data by application of the analytical algorithm discussed above. In many instances, devices maintained by merchants 152 may have inadequate processing power or may not be specifically configured to apply the algorithm so that the algorithm is applied to biometric information by the fraud-identification system 100 at block 334. The customer is thus identified by the biometric information and a check is made at block 336 whether the stored biometric information for that customer has been designated as associated with suspicious activity.

If not, and an approval code has resulted from the left prong of FIG. 3B, an approval code for the transaction is returned to the merchant 152 at block 338 so that the merchant 152 may proceed with executing the transaction with the customer at block 340. If the biometric has been designated as associated with suspicious activity, an alert may be issued back to the merchant to that effect at block 344 and in some instances an alert may also be issued to law enforcement at block 344.

Figure 3C:
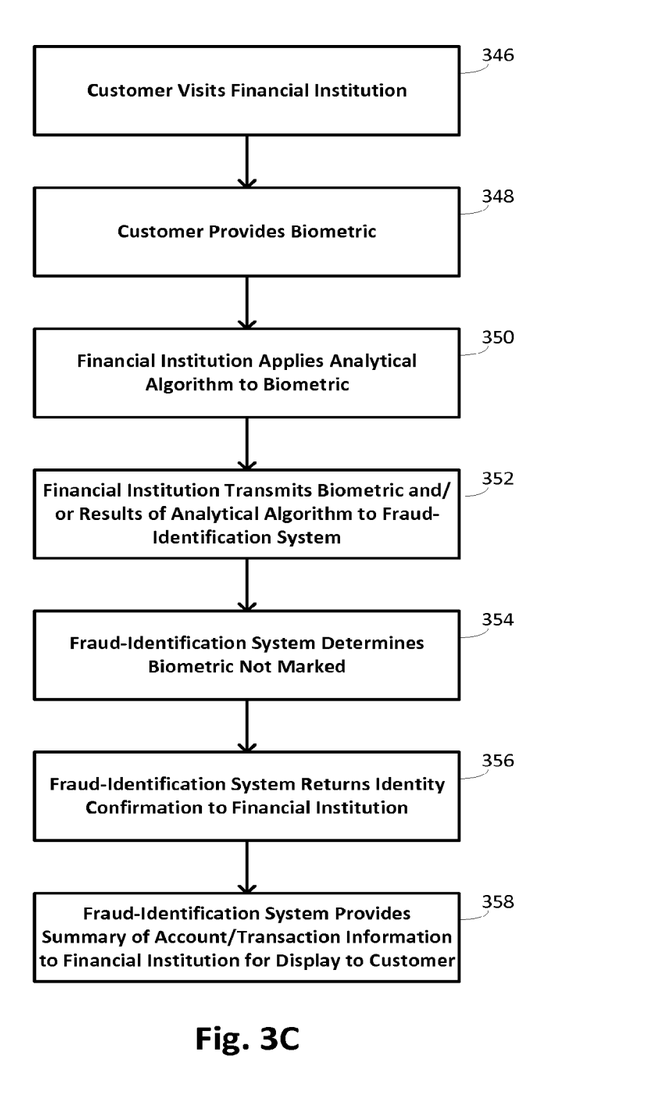

The centralized maintenance of biometric information enabled by embodiments of the invention advantageously permits other functionality to be implemented that uses the biometrics. For example, the biometric information may be used at financial institutions 120 to access information as illustrated in FIG. 3C. The customer visits the financial institution 120 at block 346 and provides a biometric measurement, permitting the financial institution 120 to apply the analytical algorithm to the biometric at block 350. The results of applying the algorithm are transmitted to the fraud-identification system 100 at block 352 so that the fraud-identification system 100 may identify the corresponding stored biometric. In some alternative embodiments, the financial institution 120 may transmit the raw biometric data so that the application of the analytical algorithm is carried out by the fraud-identification system 100 instead of by the financial institution.

Once the corresponding biometric information maintained by the fraud-identification system has been identified, a determination is made at block 354 to verify that that biometric information has not been designated as associated with suspicious activity. A confirmation of the customer's identity is accordingly returned to the financial institution 120 at block 356. Having been properly identified, in this embodiment the customer may then access information maintained by the fraud-identification system, including account and item-level transaction information, which may be displayed to the customer at block 358.

Figure 3D:
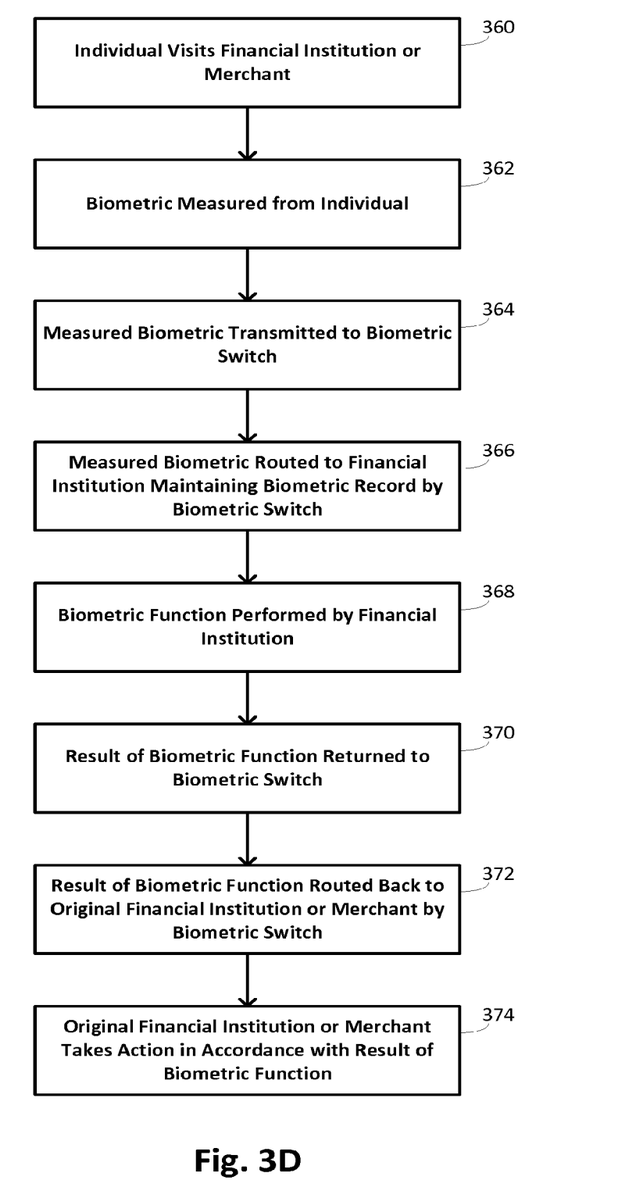

The descriptions provided above in the context of FIGS. 3B and 3C apply more directly to an architecture using a centralized biometrics repository as shown in FIG. 1A. FIG. 3D provides a flow diagram that illustrates how a distributed arrangement like that shown in FIG. 1B may be used. The methods illustrated with the flow diagram of FIG. 3D make use of the biometric switch 180 to coordinate the routing of requests and responses that make use of locally stored biometric information. These methods may begin when an individual presents himself at a financial institution or at a merchant at block 360. While such presentation will often be as part of performing some kind of transaction with the financial institution or merchant, the invention is intended also to encompass circumstances in which biometrics of employees of the financial institution or merchant are used.

A biometric measurement is accordingly taken from the individual at block 362, such as by optically scanning a fingerprint, retinal pattern, or the like. The measured biometric is transmitted to the biometric switch 180 at block 364, permitting the switch 180 at block 366 to route the measured biometric to the financial institution maintaining a purportedly corresponding biometric in its local data store 184. A biometric function is accordingly performed by the financial institution at block 368, such as by comparing aspects of the biometric received from the biometric switch 180 against the purportedly corresponding biometric. This permits a purported identity of the individual presenting himself at block 360 to be verified. A result of the biometric function, such as in the form of a confirmation or denial of a match between the measured and stored biometrics, is returned to the biometric switch at block 370. This result is routed back to the original financial institution or merchant by the biometric switch 180 at block 372, permitting the original financial institution or merchant to take appropriate action. For instance, a transaction may be denied upon discovering that a failure for the proffered biometric to be confirmed, or a transaction may be executed upon receiving satisfactory indications that identity has been verified. While this method is unlikely to be applied when the individual visits the financial institution where the purportedly corresponding biometric is maintained, it is useful when individuals attempt to perform transactions at different financial institutions or merchants.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for managing the use of biometric information for fraud risk monitoring, the method comprising:
   maintaining, at each of a plurality of financial institutions, biometric information associated with individuals, including biometric information corresponding to a specified individual that has been marked as suspicious based on a pattern of transactions, the biometric information and its marking as suspicious being stored at a local data store associated with each of the financial institutions;
   receiving, at one or more of the processors at a biometric switch, from a requesting party, biometric information for an individual transaction being conducted, the biometric switch comprising a data store at the biometric switch maintaining data used to implement the routing of the received biometric information to any of the plurality of the financial institutions maintaining the stored biometric information corresponding to the specified individual;

identifying with the biometric switch which of one or more of the plurality of financial institutions maintains biometric information at its local data store corresponding to the received biometric information for the individual transaction being conducted;

routing the received biometric information for the individual transaction from the biometric switch to the identified one or more financial institutions, the routing based on the identified financial institutions maintaining the corresponding biometric information rather than a financial account used for the individual transaction determining, at one or more of the processors at the identified one or more of the plurality of financial institutions, that the biometric information for the individual transaction is associated with the specified individual, so that fraud risk monitoring includes a determination based on the biometric information and activity associated with the biometric information, separate from data associated with the financial account used for the transaction;

issuing an alert for the requesting party when the biometric information for the individual transaction being conducted is determined, at the one or more processors at the identified one or more financial institutions, as associated with the specified individual; and separately using the received biometric information, at the one or more processors at the identified one or more financial institutions, to access the financial account to verify adequate funds in the financial account used in support of the individual transaction by an enrolled customer that has accounts associated with the biometric information;

wherein the biometric information received for conducting the individual transaction from the requesting party is processed in a two-pronged path, wherein one prong of the two-pronged path processes the transaction by accessing the financial account at one of the financial institutions of the enrolled customer to verify adequate funds for support of the individual transaction and the other prong of the two-pronged path processes the transaction to determine at the identified one or more financial institutions whether the biometric information is associated with the specified individual that has been marked as suspicious.

2. The method of claim 1, wherein the accessed account is maintained for a customer that has enrolled one or more accounts and associated the one or more accounts with biometric information for the customer.

3. The method of claim 1, wherein the requesting party comprises one of a financial institution or a merchant.

4. The method of claim 1, wherein the method further comprises:
receiving, at the biometric switch from the identified institution, the alert for the requesting party that the biometric information associated with the specified individual is suspicious; and
routing the alert from the biometric switch to the requesting party.

5. The method of claim 1, wherein the specified individual comprises an employee of one of the plurality of distinct financial institutions.

6. The method of claim 1, wherein the biometric information comprises raw biometric data.

7. The method recited in claim 1, wherein the received biometric information comprises derived biometric parameters.

8. The method recited in claim 1, wherein the step of maintaining, at each of a plurality of financial institutions, biometric information associated with individuals, comprises:
receiving, at one or more processors, financial transaction information and associated biometric information for each of a plurality of financial transactions conducted over time;
determining, at one or more of the processors, based on the financial transaction information and the biometric information for each of the plurality of financial transactions, that a pattern of transactions having biometric information corresponding to a specified individual are suspicious; and
marking, as suspicious, at one or more of the processors, biometric information associated with the specified individual.

9. The method of claim 8, wherein financial transaction information and associated biometric information for each of the plurality of financial transactions conducted over time are received regularly and substantially continuously at each of the plurality of financial institutions.

10. The method of claim 8, wherein the pattern of transactions associated with a specified individual being suspicious comprises a pattern of multiple near-simultaneous transactions at different geographical locations having biometric information associated with the specified individual.

11. A system for managing the use of biometric information for fraud risk monitoring, comprising:
a data storage system at each of a plurality of financial institutions, for maintaining biometric information associated with individuals, including biometric information corresponding to a specified individual that has been marked as suspicious based on a pattern of transactions, the biometric information and its marking as suspicious being stored at a local data store associated with each of the financial institutions;
a biometric switch for receiving, from a requesting party, biometric information for an individual transaction being conducted, for identifying which of one or more of the plurality of financial institutions maintains biometric information corresponding to the received biometric information for the individual transaction being conducted, and for routing the received biometric information for the individual transaction from the biometric switch to the identified financial institution, the routing based on the identified financial institution maintaining the corresponding biometric information rather than a financial account used for the individual transaction, the biometric switch comprising a data store at the biometric switch maintaining data used to implement the routing of the received biometric information to any of the plurality of the financial institutions maintaining the stored biometric information corresponding to the specified individual, and for separately using the received biometric information to access the financial account to verify adequate funds in the financial account used in support of the individual transaction by an enrolled customer that has accounts associated with the biometric information; and
one or more of processors at the identified one or more financial institution for determining that the biometric information for the individual transaction is associated with the specified individual and for issuing an alert for the requesting party when the biometric information for the individual transaction being conducted is associated with the specified individual, so that fraud risk monitoring by the system includes a determination based on the biometric information and activity associated with the biometric information, separate from data associated with the financial account used for the transaction;

wherein the biometric information received for conducting the individual transaction from the requesting party is processed in a two-pronged path, wherein one prong of the two-pronged path processes the transaction by accessing the financial account of the enrolled customer to verify adequate funds in the financial account, and the other prong of the two-pronged path processes the transaction to determine at the identified one or more financial institutions whether the biometric information is associated with the specified individual that has been marked as suspicious.

12. The system of claim 11, wherein the accessed account is maintained for a customer that has enrolled one or more accounts and associated the one or more accounts with biometric information for the customer.

13. The system of claim 11, wherein the requesting party comprises one of a financial institution or a merchant.

14. The system of claim 11, wherein the biometric switch receives, from the identified institution, the alert for the requesting party that the biometric information associated with the specified individual is suspicious and routes the alert from the biometric switch to the requesting party.

15. A method for managing the use of biometric information for transactions, the method comprising:

receiving, at a transaction network from a requesting party, biometric information for a transaction being conducted, the network including a biometric switch connected to financial institutions maintaining information including biometric information for individuals, the biometric information maintained at the financial institutions including biometric information associated with a specified individual that has been marked as suspicious when a pattern of transactions having biometric information corresponding to the specified individual have been identified as suspicious, the biometric information and its marking as suspicious being stored at a local data store associated with each of the financial institutions, the biometric switch comprising a data store at the biometric switch maintaining data used to implement the routing of the received biometric information to any of the plurality of the financial institutions maintaining the stored biometric information corresponding to the specified individual;

providing the received biometric information to at least one of the financial institutions through the biometric switch, the biometric switch identifying which of one or more of the financial institutions maintains biometric information at its local data store corresponding of the received biometric information for the transaction being conducted, and routing the received biometric information for the individual transaction from the biometric switch to the identified financial institutions, the routing based on the identified financial institutions maintaining the corresponding biometric information rather than a financial account used for the individual transaction, for determining, at the identified financial institutions, whether the biometric information for the individual transaction is associated with the specified individual, so that a determination of possible fraud is based on the biometric information and activity associated with the biometric information, separate from data associated with the financial account used for the transaction;

providing through the transaction network an alert for the requesting party when the biometric information maintained at the identified financial institutions and associated with the specified individual has been marked as suspicious; and separately using the received biometric information, at one of the financial institutions, to access the financial account to verify adequate funds in the financial account used in support of the individual transaction by an enrolled customer that has accounts associated with the biometric information;

wherein the biometric information received for conducting the individual transaction from the requesting party is processed in a two-pronged path at the financial institutions, wherein one prong of the two-pronged path processes the transaction by accessing the financial account at one of the financial institutions of the enrolled customer and the other prong of the two-pronged path processes the transaction to determine at the identified financial institutions whether the biometric information is associated with the specified individual that has been marked as suspicious.

16. The method of claim 15, wherein the accessed account is maintained for a customer that has enrolled one or more accounts and associated the one or more accounts with biometric information for the customer.

17. The method of claim 15, wherein the requesting party comprises one of a financial institution or a merchant.

18. The method of claim 15, wherein method further comprises:

receiving, at the biometric switch from the identified institution, the alert for the requesting party that the biometric information associated with the specified individual is suspicious; and routing the alert from the biometric switch to the requesting party.

* * * * *